UNITED STATES PATENT OFFICE.

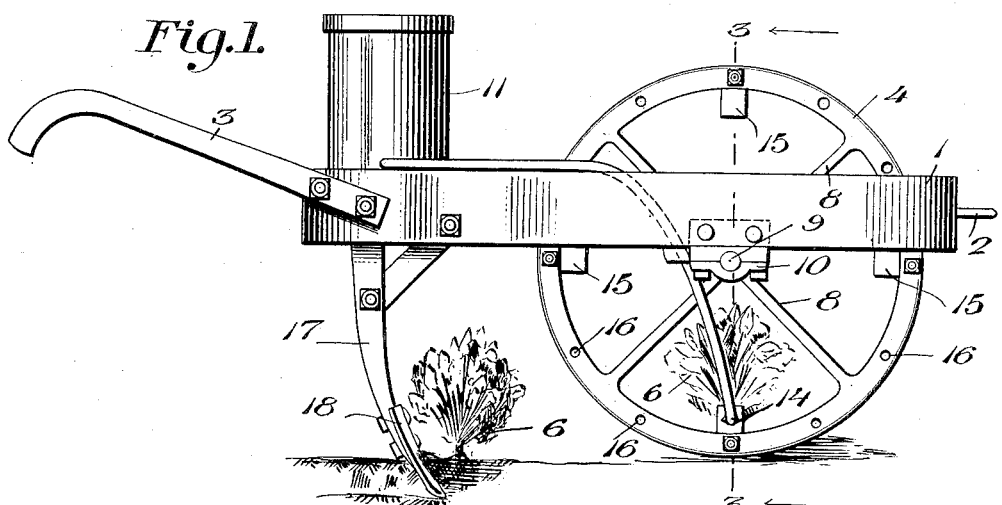
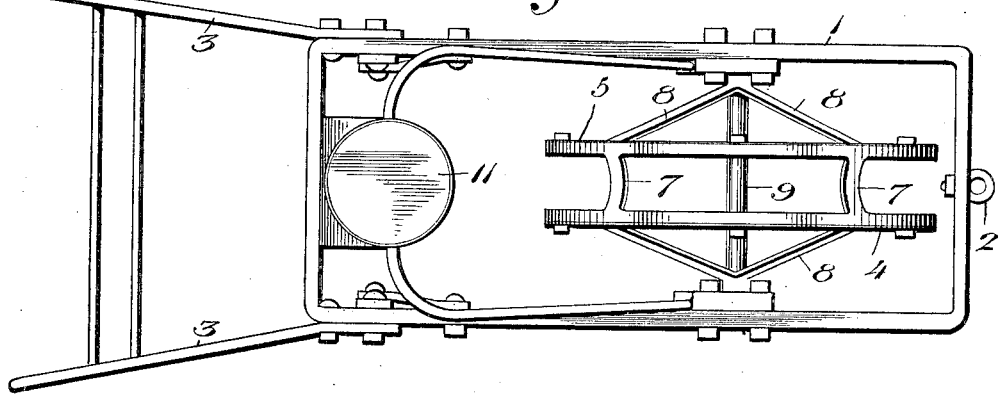
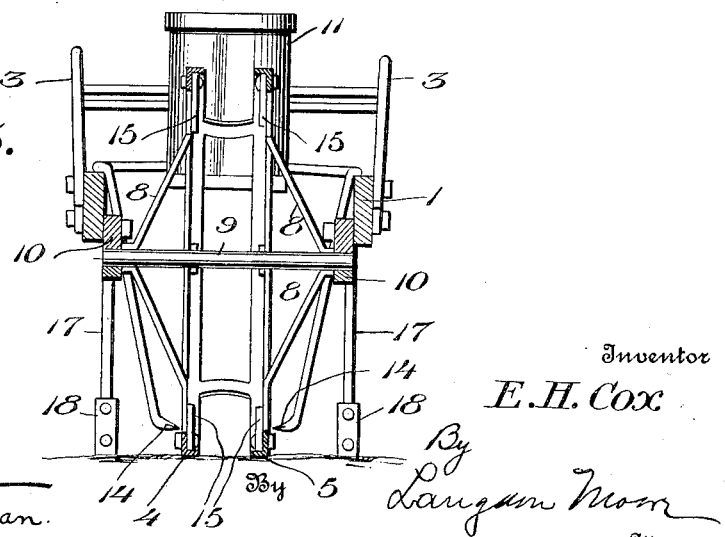

ERNEST H. COX, OF MARLOW, OKLAHOMA.

AGRICULTURAL IMPLEMENT.

1,088,969.  Specification of Letters Patent.  Patented Mar. 3, 1914.

Application filed October 11, 1913. Serial No. 794,677.

*To all whom it may concern:*

Be it known that I, ERNEST H. Cox, a citizen of the United States, residing at Marlow, in the county of Stephens and State of Oklahoma, have invented new and useful Improvements in Agricultural Implements, of which the following is a specification.

This invention relates to improvements in agricultural implements, and more particularly to a cotton thinner or implement for removing the extra cotton plants and weeds between the cotton stands.

The stands of cotton in each row are equally spaced and each stand normally contains a certain number of cotton plants.

The object of this invention is to provide an implement which may be drawn over a row of stands and which will remove all the extra plants and weeds between the normal stands.

It is a further object of this invention to arrange a plow at each side of the row, so that the cotton may be cultivated at the same time that it is thinned.

The advantages of this invention are obvious, as the extra cotton plants and weeds between the normal stands are usually removed by hoeing which is a much longer process, and with this cotton thinner the cotton may be cultivated at the same time that it is being thinned.

While the preferred form of this invention is illustrated upon the accompanying sheet of drawing, yet minor detail changes may be made without departing from the scope thereof.

Figure 1 is a view in side elevation of the embodiment of this invention. Fig. 2 is a top plan view of Fig. 1. Fig. 3 is a view in transverse vertical section taken on the line 3—3 of Fig. 1 looking to the left.

In carrying out this invention a thinning wheel is mounted within the forward portion of the frame 1. An eye bolt 2 is centrally secured to the front cross member of the frame for hitching a team of horses and handles 3 are are secured to the rear of the frame for guiding the implement.

The thinning wheel comprises two rims 4 and 5 of equal diameters spaced apart a sufficient distance to straddle a row of normal stands of cotton, such as indicated by 6 on Fig. 1, which are rigidly united by curved joining members 7. Spokes 8 of each wheel and the rims 4 and 5 are preferably of metal and spokes and sides of the rim are constructed as narrow as possible without detriment to the strength of the wheel, for purposes hereinafter explained. The hubs of the spokes of each rim are mounted upon a shaft 9 which is carried in bearings 10 preferably secured to the bottom of the side members of the frame 1.

At the rear of the frame 1 is supported a fluid fuel tank or reservoir 11, from which leads fuel pipes 12 and 13 on either side of the frame and extend to a point beneath the shaft 9. A burner 14 on the end of each pipe directs the flame of the ignited fuel just over the rim and upon the ground therebetween. A plurality of fenders 15 in the form of plates are bolted upon each rim, equally and correspondingly spaced, so that the path of the flame will be interrupted as each pair of fenders pass between the burners. A plurality of bolt holes 16 are provided in each rim, equally and correspondingly spaced, so that the distance between the fender plates may be adjusted to the distance between the normal stands of cotton.

At the rear of the side members of the frame 1 foot pieces 17 are secured to which cultivating plows 18 may be attached.

The fuel may be either gas, liquid, or liquid under pressure, such as gasolene. The flame being directed over the narrow rims on each side will burn all the vegetation between the rims as it advances, but the fender plates 15 will save the necessary number of cotton plants to make the normal stand, the spokes being as narrow as possible will not materially effect the path of the flames.

What I claim is:—

1. An implement for thinning cotton, comprising a supporting frame, a fluid fuel tank thereon, a wheel comprising two spaced apart rims mounted upon the frame, fuel burners upon each side thereof, means connecting the burners to the tank and supporting the burners to direct the flames thereof upon the ground beneath the axis of the wheel, and means upon the rim for interrupting the flame at predetermined distances.

2. An implement for thinning cotton, comprising a frame, a fluid fuel tank supported thereon, a thinning wheel comprising two spaced apart joined rims of equal diameters carried upon a shaft mounted upon a frame, pipes leading from the fuel tank on each side of the frame supporting burners arranged beneath the wheel shaft upon the outer side of each rim and adapted to direct the flame upon the ground between the rims, and an adjustable means upon the rims for interrupting the flame simultaneously at predetermined distances.

3. An implement for thinning cotton, comprising a frame, a fluid fuel tank supported thereon, a thinning wheel comprising two spaced apart joined rims of equal diameters carried upon a shaft mounted upon the frame, pipes leading from the fuel tank upon each side of the frame supporting burners arranged beneath the wheel shaft upon the outer side of each rim and adapted to direct the flame upon the ground between the rims, correspondingly spaced fender plates secured to the rim adapted to interrupt the burner flame, means upon the rim for correspondingly changing the relation of the fender plates to each other, and means for supporting cultivating plows upon the frame to the rear of the thinning wheel.

ERNEST H. COX.

Witnesses:
GLENN W. RUBENDALL,
J. W. TALLA.

Copies of this patent may be obtained for five cents each, by addressing the "Commissioner of Patents, Washington, D. C."